(12) United States Patent
Bennett et al.

(10) Patent No.: US 7,647,051 B2
(45) Date of Patent: Jan. 12, 2010

(54) CALL RE-ROUTING UPON CELL PHONE DOCKING

(75) Inventors: James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 544 days.

(21) Appl. No.: 11/152,955

(22) Filed: Jun. 15, 2005

(65) Prior Publication Data

US 2006/0166674 A1 Jul. 27, 2006

Related U.S. Application Data

(60) Provisional application No. 60/646,254, filed on Jan. 24, 2005.

(51) Int. Cl.
*G06F 15/16* (2006.01)
(52) U.S. Cl. .................................... 455/445; 455/569.1
(58) Field of Classification Search .................. 455/445, 455/569.1
See application file for complete search history.

(56) References Cited

U.S. PATENT DOCUMENTS

| 6,704,580 | B1 * | 3/2004 | Fintel ........................ 455/550.1 |
| 2005/1009027 | * | 4/2005 | Sylvain ....................... 455/461 |
| 2005/0239498 | A1 * | 10/2005 | Dorenbosch et al. ...... 455/552.1 |
| 2007/0004473 | A1 * | 1/2007 | Clark et al. ............... 455/575.2 |

* cited by examiner

*Primary Examiner*—Sam Bhattacharya
(74) *Attorney, Agent, or Firm*—Garlick Harrison & Markison; James A. Harrison

(57) ABSTRACT

A method and apparatus are provided for call setup in a communication network that comprises at least one mobile station to facilitate the hand-off of a wireless headset from a mobile station that has been docked to a landline base unit that includes a radio front end operable to communicate with the wireless headset. Generally, the embodiments of the invention include establishing a first voice path through at least one switching element between a calling party and a called party in a communication network where at least one of the called and calling parties is communicating with the mobile station or, more generally, with a wireless telephone. Thereafter, a first wireless headset communication link is established between the wireless telephone and the wireless headset unit.

22 Claims, 7 Drawing Sheets

CALL RE-ROUTING UPON CELL PHONE DOCKING

CROSS REFERENCES TO RELATED APPLICATIONS

The present U.S. Utility Patent Application claims priority pursuant to 35 U.S.C. § 119(e) to the following U.S. Provisional Patent Applications which are hereby incorporated herein by reference in their entirety and made part of the present U.S. Utility Patent Application for all purposes:

1. U.S. Provisional Application Ser. No. 60/646,254, entitled "Call Re-routing Upon Cell Phone Docking," filed Jan. 24, 2005, expired.

BACKGROUND

1. Technical Field

The present invention relates to wireless communications and, more particularly, to cellular wireless communication systems and a method of call setup therefor.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Local Area Networks (wired LANS), e.g., Ethernets, support communications between networked computers and other devices within a serviced area. These wired LANs often link serviced devices to Wide Area Networks and the Internet. Each of these networks is generally considered a "wired" network, even though some of these networks, e.g., the PSTN, may include some transmission paths that are serviced by wireless links.

Wireless networks have come into existence more recently. Examples include cellular telephone networks, wireless LANs (WLANs), and satellite communication networks. Common forms of WLANs, such as IEEE 802.11(a) networks, IEEE 802.11(b) networks, and IEEE 802.11(g) networks, are referred to jointly as "IEEE 802.11 networks." In a typical IEEE 802.11 network, a wired backbone couples to a plurality of wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support ad-hoc networking in which wireless terminals communicate directly to one another without the presence of an AP.

WLANs now also support voice communications via wireless voice terminals. In supporting the wireless voice terminals, the WLAN works in cooperation with a Private Branch Exchange (PBX) to interface the WLAN with the PSTN. A serviced call is routed between the PSTN and a serviced wireless voice terminal via the PBX and the WLAN. In addition to WLANs, personal area networks (PANs) are gaining in popularity. Initially conceived to reduce cabling between devices, PAN technologies, and more specifically, Bluetooth based PANs or piconets, are adding yet another wireless layer to existing networks. For example, Bluetooth radios may be embedded in wireless headsets, printers, wireless keyboards, etc., to communicatively couple a peripheral device to a network component. For example, Bluetooth may be used to wirelessly couple a wireless headset to a handset that may be used in either a cellular network or merely in a PSTN based cordless phone. One problem not addressed in the prior art, however, relates to handoff of a wireless handset between cellular networks and especially the handoff of a wireless headset that is communicatively coupled to the wireless handset engaged in a cellular call to a specified landline docking station base unit that is operable to conduct telephone calls over the PSTN, and more particularly, a system and method for such handoff when a mobile station actively engaged in a call is docked in a docking station.

SUMMARY OF THE INVENTION

A method and apparatus are provided for call setup in a communication network that comprises at least one mobile station to facilitate the hand-off of a wireless headset from a mobile station that has been docked to a landline base unit that includes a radio front end operable to communicate with the wireless headset. Generally, the embodiments of the invention include establishing a first voice path through at least one switching element between a calling party and a called party in a communication network where at least one of the called and calling parties is communicating with the mobile station or, more generally, with a wireless telephone. Thereafter, a first wireless headset communication link is established between the wireless telephone and the wireless headset unit. While the call is active, once the wireless telephone is docked, the various embodiments of the invention include transmitting call setup signals to the switching element to switch from a first to a second voice path. In one embodiment of the invention, the mobile station is operable to determine to generate the call setup signaling to transfer voice paths. In an alternate embodiment of the invention, the wireless headset is operable to instruct the wireless telephone to initiate the transfer upon receiving an indication that a second wireless headset communication link has been established. In yet another embodiment of the invention, the landline base unit is operable to determine when the voice path should be switched from the first to the second voice path and to generate signaling to the at least one switching element to prompt the transition from the first voice path to the second voice path.

In an embodiment of the invention in which the wireless headset is operable to communicate according to a Bluetooth protocol, the wireless headset is further operable to, as master of a Bluetooth piconet, to determine when a parallel voice path should be formed, when switching should occur, and when a first wireless headset communication link should be terminated after switching to the second voice path. In an embodiment of the invention where the wireless headset does not include such logic, the wireless headset is operable to switch master/slave roles with one of the wireless telephone or the landline base unit, and more specifically, to the landline base unit, to facilitate the landline base unit determining when to initiate switching and when to drop the first wireless headset communication link.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
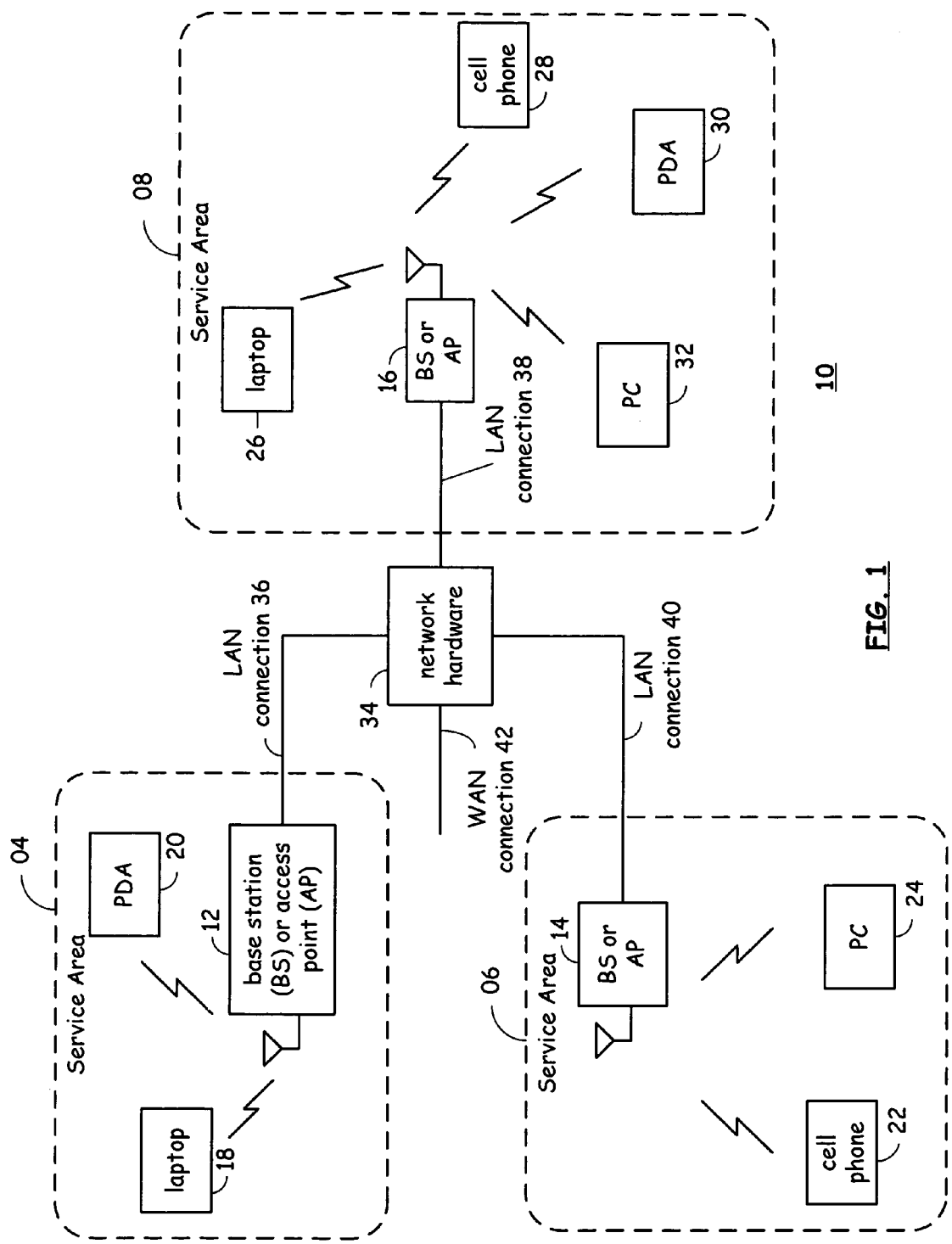
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-7.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10 to an external network element. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
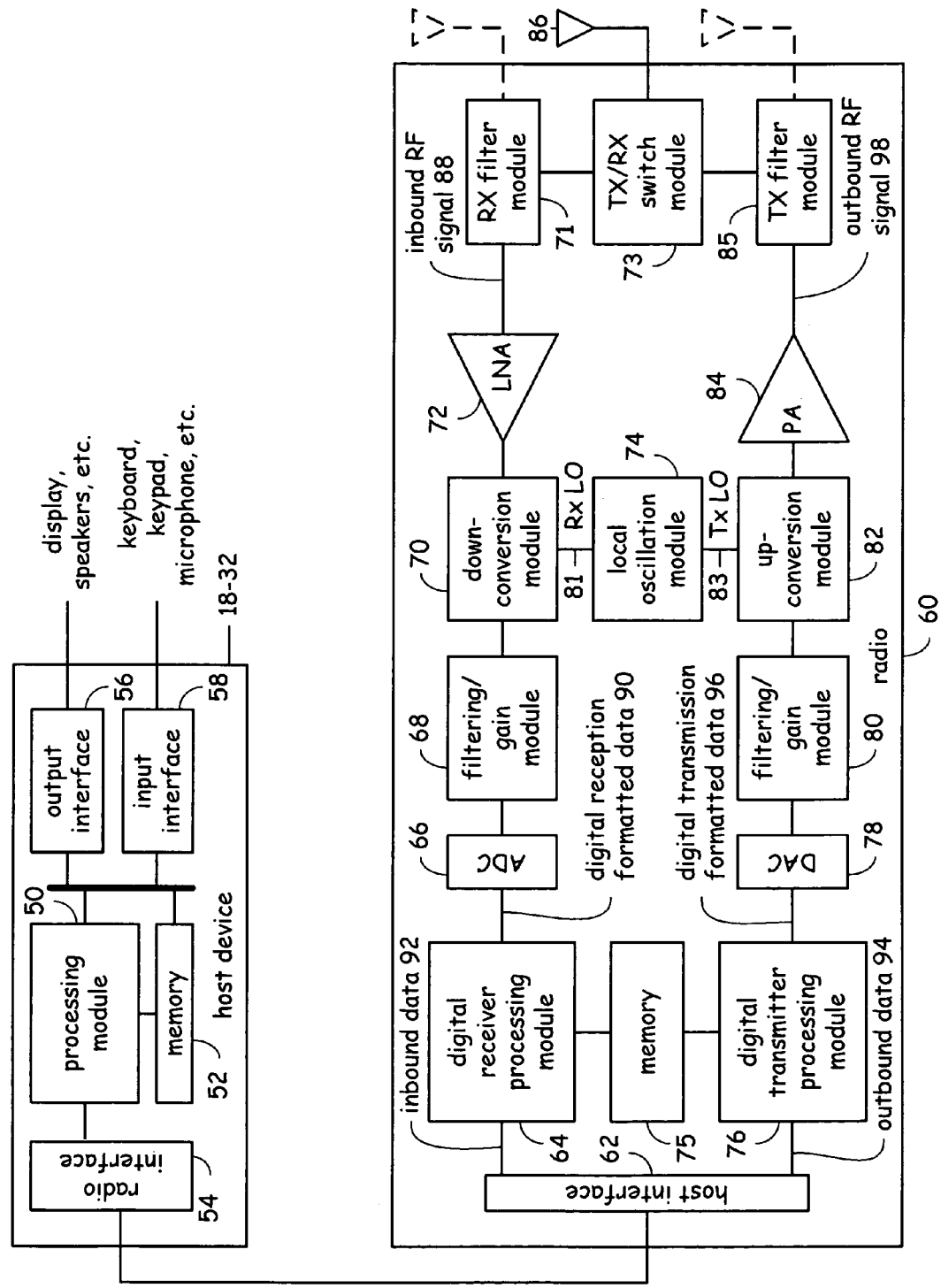
FIG. 2 is a schematic block diagram illustrating a wireless communication host device and an associated radio.

FIG. 2 is a schematic block diagram illustrating a wireless communication device 18-32 as a host device and an associated radio 60. For cellular telephone hosts, radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device, such as a display, monitor, speakers, etc., such that the received data may be displayed. Radio interface 54 also provides data from processing module 50 to radio 60. Processing module 50 may receive the outbound data from an input device, such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an up-conversion module 82, a power amplifier (PA) 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from host wireless communication device 18-32 via host interface 62. Host interface 62 routes outbound data 94 to digital transmitter processing module 76, which processes outbound data 94 in accordance with a particular wireless communication standard (e.g., IEEE 802.11a, IEEE 802.11b, Bluetooth, etc.) to produce digital transmission formatted data 96. Digital transmission formatted data 96 will be a digital baseband signal or a digital low IF signal, where the low IF typically will be in the frequency range of 100 kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via TX/RX switch module 73, where RX filter module 71 bandpass filters inbound RF signal 88. The RX filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the host wireless communication device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of host device 18-32 and digital receiver processing module 64 and digital transmitter processing module 76 of radio 60 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

The wireless communication device of FIG. 2 is one that may be implemented to include either a direct conversion from RF to baseband and baseband to RF or for a conversion by way of a low intermediate frequency. In either implementation, however, for up-conversion module 82 and down-conversion module 70, it is required to provide accurate frequency conversion. For down-conversion module 70 and up-conversion module 82 to accurately mix a signal, however, it is important that local oscillation module 74 provide an accurate local oscillation signal for mixing with the baseband or RF by up-conversion module 82 and down-conversion module 70, respectively.

Accordingly, local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
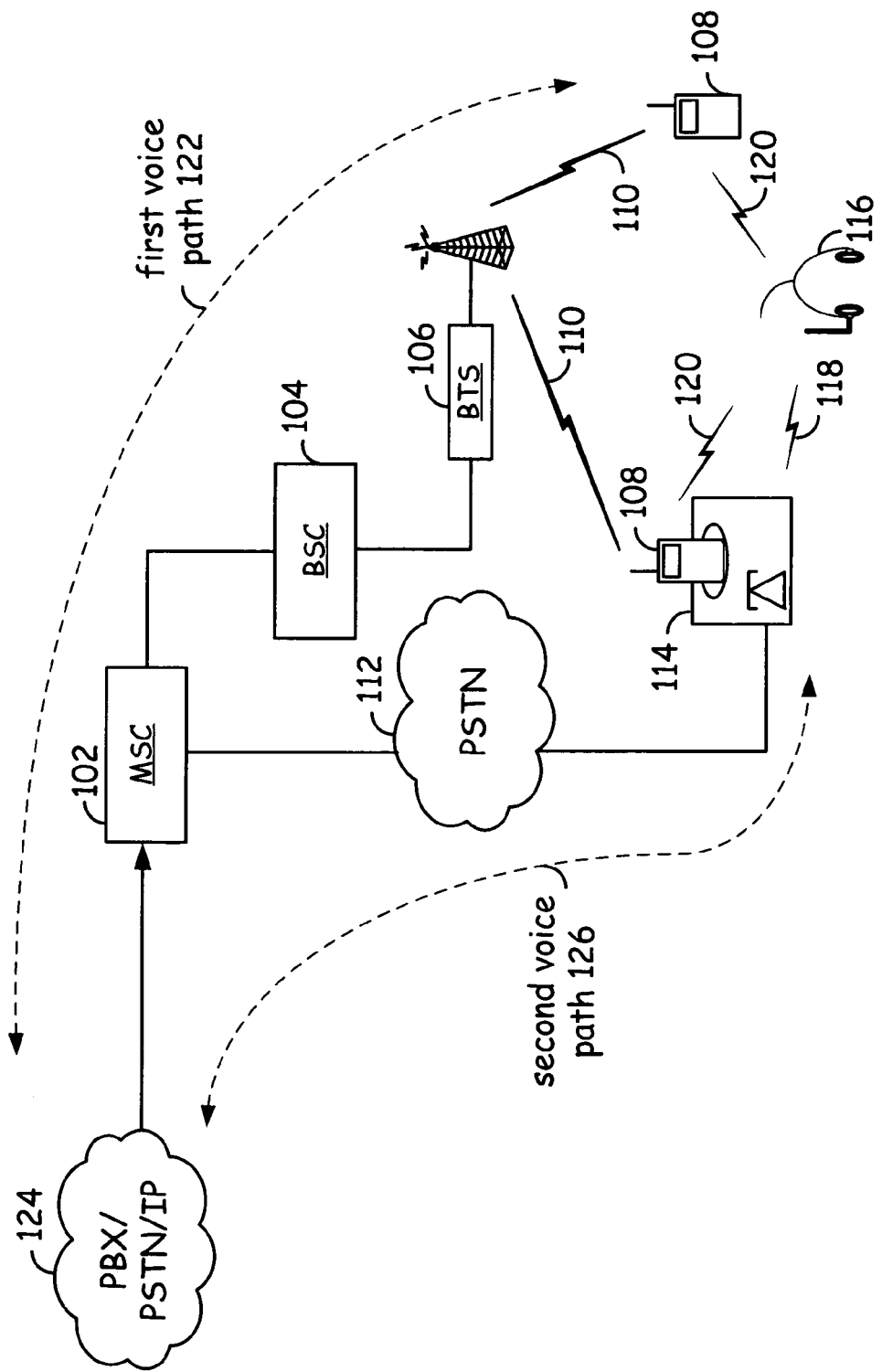
FIG. 3 is a partial communication network that illustrates one embodiment of the present invention.

FIG. 3 is a partial communication network that illustrates one embodiment of the present invention. A partial communication network 100 includes a switching element that routes control and voice signaling through the partial communication network 100. In the described embodiment, the switching element comprises a mobile switching center (MSC) 102. MSC 102 is further coupled to a base station controller (BSC) 104 that controls communications through a base station transceiver system (BTS) 106. BTS 106 transmits and receives wireless communication signals with cellular mobile stations, such as mobile station (MS) 108. Any one of the aforementioned cellular technologies may be represented herein by MSC 102, BSC 104, BTS 106 or MS 108. In the specific example, BTS 106 and MS 108 exchange communication signals over a communication channel 110.

MSC 102 is further operatively coupled to a public switched telephone network (PSTN) 112 that carries voice and control signaling for the landline telephone networks. It is understood that PSTN 112 includes traditional telephone networks, as well as newer SS7-based telephone networks that utilize a signaling plane as well as a voice plane. In the described example, PSTN 112 is further coupled to a plurality of PSTN landline phones (not shown), as well as to a docking station base unit 114. Docking station base unit 114 includes an internal modem and is operable to establish a telephone connection through PSTN 112. Docking station base unit 114 is operable to receive and charge MS 108.

In the described embodiment of the invention, docking station base unit 114 includes a radio front end for engaging in wireless communications with wireless headsets. In one embodiment of the invention, the radio front end is operable to communicate according to a Bluetooth protocol with a Bluetooth-enabled wireless headset. As shown herein, docking station base unit 114 is operable to communicate with a wireless headset 116 over a wireless headset communication link 118. As may further be seen, wireless headset 116 is operable to communicate over a wireless headset communication link 120 with MS 108. As is suggested by the figure, wireless headset 116 is operable to communicate over a wireless headset communication link 120 with MS 108 when MS 108 is mobile or when MS 108 is docked within docking station base unit 114.

Continuing to examine FIG. 3, MSC 102 is further coupled to any one of a plurality of networks or systems to which calls may be routed, or from which calls may be received. Typically, a voice path would be set up from an external network, to MS 108, for example, for a given call. Thus, a first voice path 122 is shown through MSC 102, BSC 104, BTS 106 and communication channel 110 to MS 108. Thus, for example, if a call is received from an external network, shown herein as PBX/PSTN/IP 124, then the voice path is as described, wherein voice is routed through first voice path 122. PBX/PSTN/IP 124 represents, as should be understood, to be either a private branch exchange, a public switched telephone network, or an IP network having a corresponding user terminal from which a call may be received. In the described embodiment of the invention, a second voice path 126 is defined from MSC 102 through PSTN 112 to docking station base unit 114. Docking station base unit 114, as described before, includes circuitry for conducting calls through the PSTN, as well as a radio front end for transmitting and receiving voice to a wireless headset, such as wireless headset 116. In operation, the invention is operable to initially carry a call through first voice path 122 and then, upon receiving an indication that MS 108 has been docked within docking station base unit 114, to create a parallel call through second voice path 126 to facilitate handover of the call from MS 108 to docking station base unit 114. Significantly, wireless headset 116 must be handed over from MS 108 to docking station base unit 114. Thus, communication signals received on the first voice path 122 that are transmitted over wireless headset communication link 120 to wireless headset 116 are switched to be carried over the second voice path 126 to docking station base unit 114 and over wireless headset communication link 120 to wireless headset 116. Such operation is advantageous in that typical reliability considerations, as well as economic considerations, make a public switched telephone network user terminal preferable for carrying a call over a wireless communication link to a cell phone, such as MS 108. As is known, a cell phone or mobile station (MS) 108 is subject to interference, thereby reducing call quality. Moreover, there is typically an associated "per minute" cost with cell phones, while (at least in North America) there is no per minute cost for local calls through the PSTN.

The various embodiments of the invention, therefore, are operable to facilitate the handover of the wireless headset for MS 108 to docking station base unit 114. In one embodiment of the invention, MS 108 includes the logic for effecting such handover. In another embodiment of the invention, wireless headset 116 includes the logic for effecting such handover. In the first embodiment, in which MS 108 includes the logic for effecting such handover, the mobile station is operable, upon determining that it has been docked within docking station base unit 114, to initiate a call over communication channel 110 to BTS 106 and BSC 104, to establish the parallel call through the second voice path 126. More specifically, MS 108 generates call setup signals to an assigned PSTN telephone number for docking station base unit 114. Accordingly, BSC 104 is operable to communicate with MSC 102 to route a call, and more specifically, to set up a call, through PSTN 112 to docking station base unit 114. MS 108 is also operable to initiate procedures to add docking station base unit 114 to a wireless piconet that includes at least wireless headset 116 and MS 108. Accordingly, wireless headset 116 is operable to transmit and receive voice signals over a wireless headset communication link 118 while continuing to support the call over wireless headset communication link 120. For example, if MS 108 is operating as a master of the piconet that includes MS 108, wireless headset 116 and docking station base unit 114, one embodiment of the invention includes MS 108 trading master/slave roles with one of wireless headset 116 and docking station base unit 114. In any embodiment, however, once wireless headset communication link 118 is established between wireless headset 116 and docking station base unit 114, and after resources are allocated to the second voice path 126 (if the actual voice path has not yet been created), then MS 108 is operable to generate an indication to MSC 102 to switch from the first voice path 122 to the second voice path 126. Thereafter, first voice path 122 may be torn down and wireless headset communication link 120 may be terminated.

In an alternate embodiment of the invention, wireless headset 116 is operable to act as a master of the piconet and to add docking station base unit 114 to the piconet that already includes wireless headset 116 and MS 108. Accordingly, after docking station base unit 114 has been added to the piconet, and docking station base unit 114 produces an indication to wireless headset 116 that either the second voice path 126 has been established or that resources have been allocated to second voice path 126, then wireless headset 116 is operable to generate a signal to prompt MSC 102 to switch from the first voice path 122 to the second voice path 126. Moreover, wireless headset 116 is operable to determine whether to terminate wireless headset communication link 120 with MS 108 as necessary.

Figure 4:
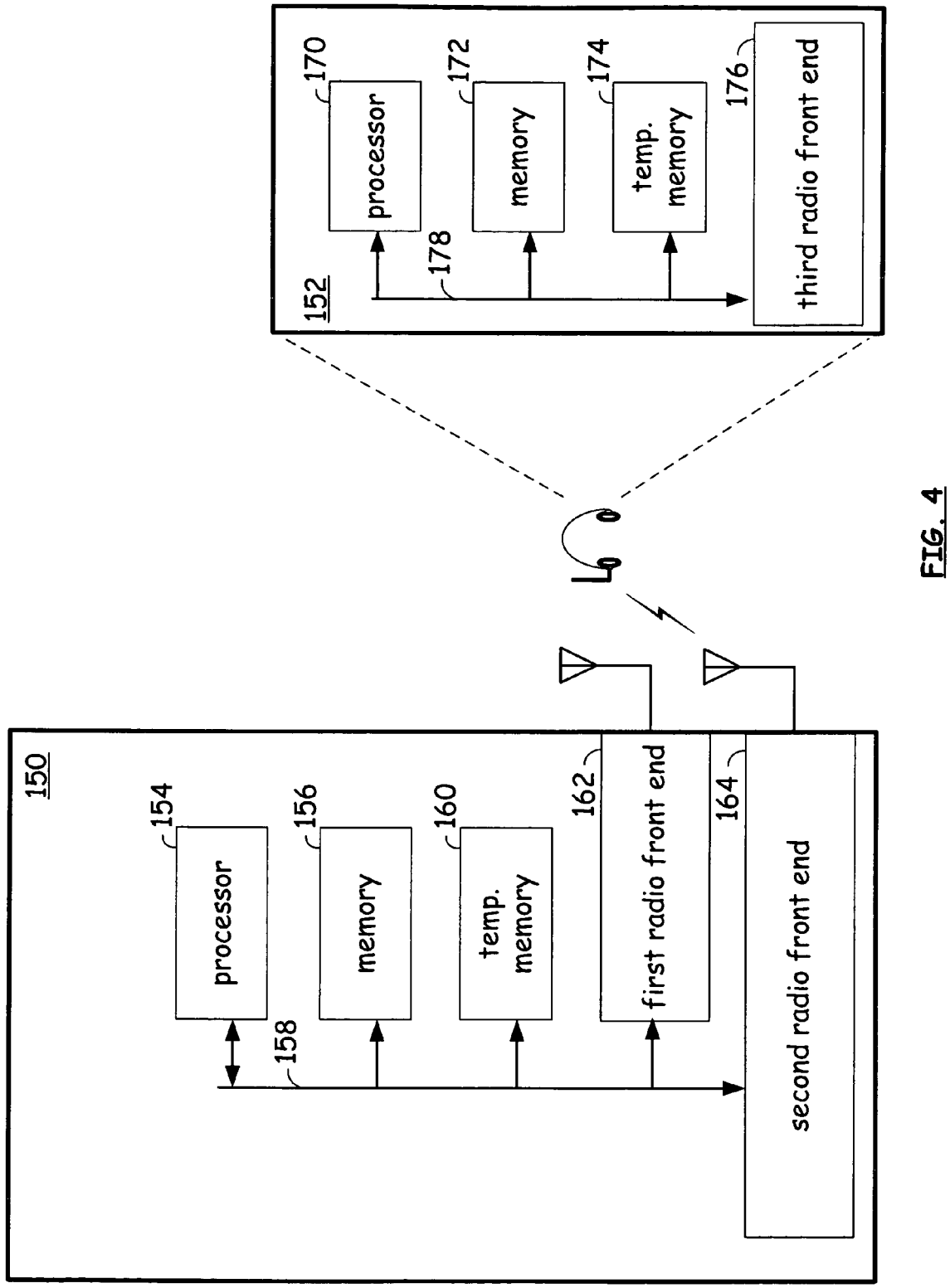
FIG. 4 is a functional block diagram of a mobile station and a wireless headset according to one embodiment of the present invention.

FIG. 4 is a functional block diagram of a mobile station (MS) 150 and of wireless headset 152 according to one embodiment of the present invention. As may be seen, MS 150 includes a processor 154 that is operably coupled to communicate with a memory 156 over a bus 158. Additionally, processor 154 is operable to communicate with a temporary memory 160, a first radio front end 162 and a second radio front end 164 over bus 158. In the described embodiment of the invention, first radio front end 162 is operable to communicate with a base station according to any one of a plurality of previously mentioned cellular protocols, including GSM, EDGE, CDMA, North American TDMA, as well as various cellular data packet network protocols, including 1xEVDO, 1xEVDD, UMTS, etc. Second radio front end 164 is operable, in the described embodiment, to communicate according to a Bluetooth protocol. Alternatively, second radio front end 164 is operable to communicate over any known WLAN protocol, including 802.11 standard protocols.

Wireless headset 152 also includes a processor 170 that is operable to communicate with a memory 172, a temporary memory 174 and a third radio front end 176 over a bus 178. In the described embodiment, third radio front end 176 is operable to communicate according to the Bluetooth protocol. Generally, third radio front end 176 is operable to communicate with second radio front end 164. Memory 156 of MS 150, and memory 172 of wireless headset 152, include computer instructions that define operational logic as is defined herein for the respective devices. Thus, memory 156 of MS 150 includes routine operating logic for cellular operations through first radio front end 162 and for Bluetooth or WLAN operations through second radio front end 164 according to whether second radio front end 164 is a Bluetooth radio or WLAN radio. Similarly, memory 172 of wireless headset 152 includes computer instructions for communicating according to the Bluetooth or WLAN protocol third radio front end 176.

In an embodiment where the mobile station controls or initiates the creation of a parallel call path for switchover from a first voice path to a second voice path, memory 156 further includes computer instructions to define such operational logic as is described herein. Likewise, memory 172 of wireless headset 152 includes logic for operation according to the various embodiments described for the wireless headset. For example, memory 172 includes logic for initiating a parallel call from MS 150 to effectuate a switch from a first voice path to a second voice path. Additionally, for that embodiment, memory 172 defines logic for prompting MS 150 to generate a call signal to a switching element, such as MSC 102 of FIG. 3, to cause the switching element to switch the voice path from the first voice path to the second voice path. Memory 172 further defines logic for establishing a wireless headset communication link with a fourth radio front end that is compatible with second and third radio front ends 164 and 176, respectively, of a docking station, such as docking station base unit 114 of FIG. 3, and, as necessary, to drop a communication link through the third radio front end 176 of wireless headset 152 with the second radio front end 164 of MS 150.

Figure 5:
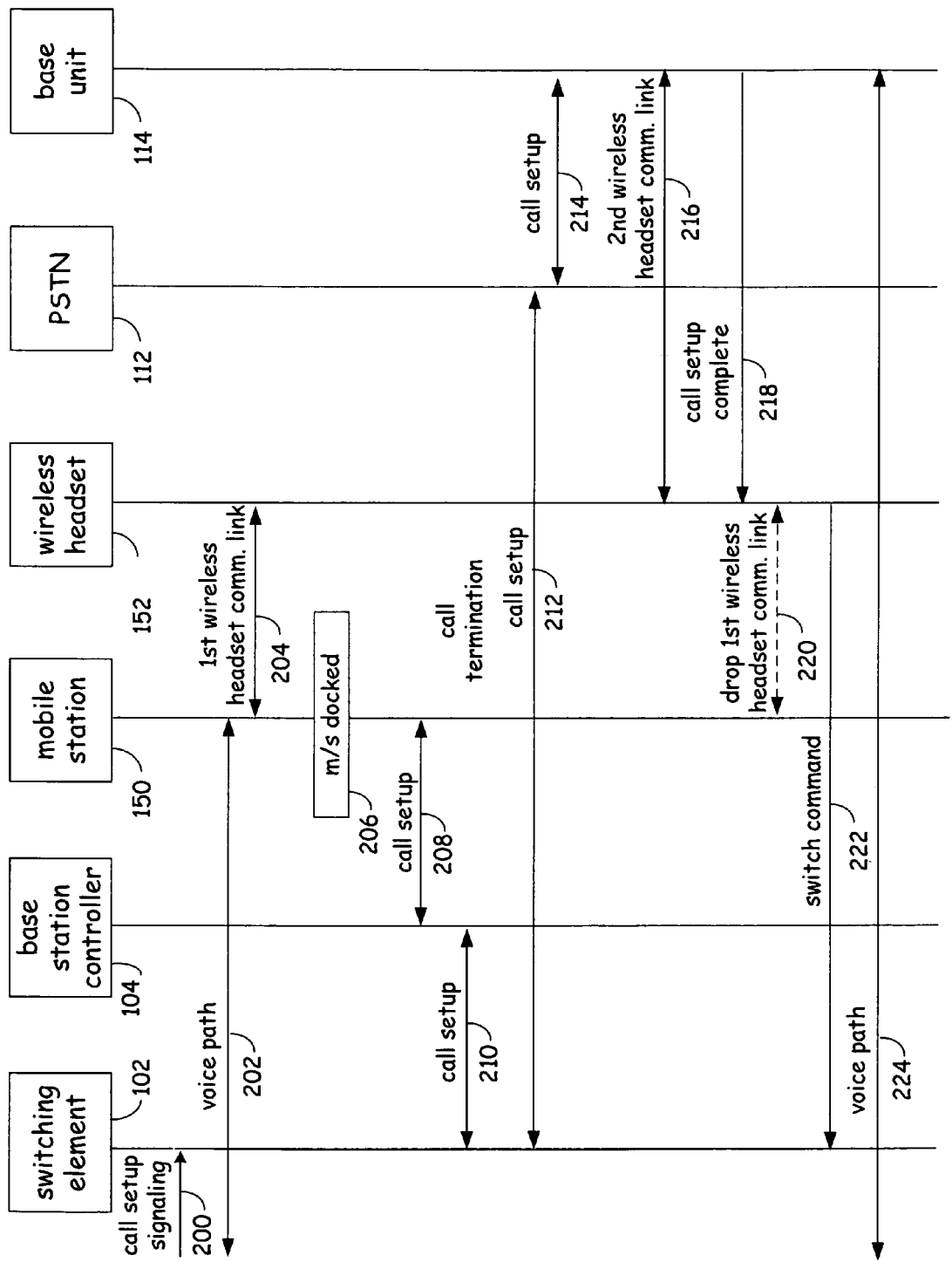
FIG. 5 is a signal sequence diagram that illustrates operation according to one embodiment of the present invention.

FIG. 5 is a signal sequence diagram that illustrates operation according to one embodiment of the present invention. Referring now to FIG. 5, the signal sequence diagram is shown between elements already described above, namely, switching element 102, base station controller 104, mobile station 150, wireless headset 152, PSTN 112, and docking station base unit 114. Switching element 102 was shown in FIG. 3 as MSC 102. Generally, however, the invention is not limited to MSCs and is operable with any type of switching element according to a network which will switch from a first voice path to a second voice path. Accordingly, in a traditional PSTN or cellular network, the switching element is an MSC and is operable to switch a voice bearer path from a first voice bearer path to a second voice bearer path. The reference herein to voice path, however, is intended to be broader than voice bearer path and includes network elements that may switch other types of voice channels, including the routing of data packets in a data packet network. Thus, switching element 102 may comprise a router in an IP network.

Initially, switching element 102 engages in call setup with an external network element and either receives or transmits call setup signaling 200. For exemplary purposes, the example will illustrate call setup signaling 200 being received from an external network element. After receiving call setup signaling 200, and performing known steps of establishing a call, a voice path is established between the external network element and the called party, which here is MS 150. As is shown, therefore, a voice path 202 is conducted through base station 104 to MS 150. At a time prior to, or subsequent to, the voice path 202 being created to MS 150, a first wireless headset communication link 204 is established between MS 150 and wireless headset 152. In the described embodiment, first wireless headset communication link 204 is a Bluetooth protocol communication link. Thus, communication signals, and more specifically, voice that is conducted along voice path 202 is transmitted between MS 150 and wireless headset 152 over first wireless headset communication link 204. Some time thereafter, in the described example, the mobile station is docked in a docking station base unit, such as base unit 114. In the example, the docking of the mobile station is shown at 206. Responsive to the mobile station being docked, MS 150 generates call setup signals 208 to base station 104 which, in turn, generates call setup signals 210 to switching element 102. Switching element 102 then generates call setup signals 212 to PSTN 112 which responds by generating additional call setup signals 214 to base unit 114. Either before these steps or subsequent to these steps, a second wireless headset communication link 216 is established between base unit 114 and wireless headset 152. Thereafter, once voice path resources have been reserved or allocated for a call through PSTN 112 to base unit 114, the call setup is complete. Accordingly, base unit 114 generates a call setup complete signal 218 which is transmitted to wireless headset 152 or, alternatively, to MS 150. Thereafter, the first wireless headset communication link 204 may be terminated as shown at 220. In the described embodiment of FIG. 5, the call setup complete signal 218 is produced to wireless headset 152 which facilitates the wireless headset 152 generating a switch command 222 to switching element 102. Approximately at the same time, meaning either prior to or subsequent to the described signaling, a second voice path 224 is established from base unit 114 through switching element 102 to the external network element. As such, the voice path has been switched from voice path 202 to voice path 224 and is carried through second wireless headset communication link 216 instead of first wireless headset communication link 204. Alternatively, as described before, an alternate embodiment of the invention includes MS 150 effecting the switch from the first voice path 202 to the second voice path 224. Accordingly, in that embodiment, the call setup complete signal 218 is transmitted from base unit 114 to MS 150 which generates switch command 222 to switching element 102. Thereafter, either wireless headset 152 or MS 150 transmits a signal 220 to initiate the tear-down of the first wireless headset communication link 204.

Figure 6:
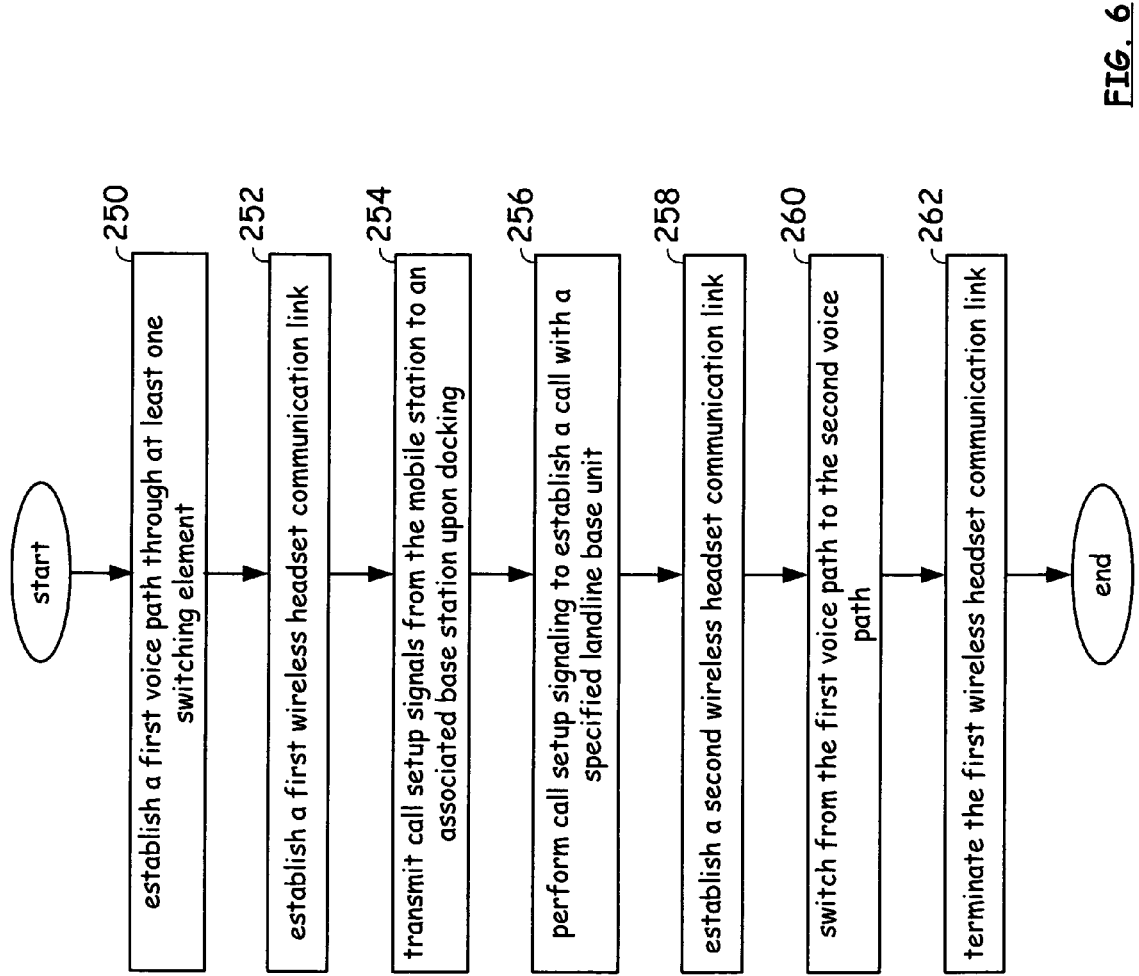
FIG. 6 is a flowchart illustrating a method according to one embodiment of the present invention.

FIG. 6 is a flowchart illustrating a method according to one embodiment of the present invention. Initially, in a communication network, a first voice path is established through at least one switching element (step 250). This voice path, in a telephone network, might be referred to as a voice bearer path and is between a calling party and a called party. For the purposes of the present invention, at least one of the calling party and the called party is communicating with a mobile station as the invention relates to hand-off of a wireless headset that is operatively coupled to a mobile station once the mobile station is docked. Along these lines, the embodiments of the invention contemplate a Bluetooth radio associated with the docking station to facilitate a voice path through the cellular network being switched to the public switched telephone network and terminated at the docking station or base unit wherein a wireless headset communication link between the mobile station and the wireless headset is switched to be between the base unit and the wireless headset, and more particularly, between the front end radio associated with the base unit. Thus, an additional step of the present embodiment of the invention, is to establish a first wireless headset communication link (step 252) between the wireless headset and the mobile station. While the call is active, the embodiments of the invention provide for a hand-off from a first voice path to a second voice path in response to the mobile station being docked. Therefore, after the mobile station is docked, the embodiment of the invention includes the mobile station transmitting call setup signals to an associated base station (step 254). Within the network, additional call setup signaling is performed to establish a call with a specified landline docking station base unit (step 256). The specified landline docking station base unit is identified by a phone number, in the described embodiment of the invention, and a call is set up to that landline base unit as if a call were originally being placed to that base unit.

Additionally, before hand-off can occur, the wireless headset must have a wireless headset communication link established between itself and the specified landline docking station base unit, or radio front end associated therewith (step 258). Thus, once resources have been allocated for the second voice path, and in a telephone network, a second voice bearer path, and the second wireless headset communication link has been established, the embodiment of the invention includes switching from the first voice path to the second voice path (step 260). In one embodiment of the invention, the mobile station generates a signal to trigger a switching element to switch from the first voice path to the second voice path. In an alternate embodiment of the invention, the wireless headset generates an indication to the mobile station to prompt the mobile station to generate a signal to the switching element to prompt the switching element to switch from the first voice path to the second voice path. Finally, according to one embodiment of the invention, the first wireless headset communication link is terminated (step 262). Either the wireless headset or the mobile station or the specified landline docking station base unit may determine to terminate the first wireless headset communication link after switching from the first voice path to the second voice path.

In an embodiment of the invention where the first and second wireless headset communication links operate according to Bluetooth protocol requirements, one of the wireless headset, mobile station, and specified landline docking station base unit, must operate as a master, while the others operate as a slave in a piconet of the three devices. Accordingly, one aspect of the present invention contemplates the mobile station switching master/slave roles with one of the wireless headset and the specified landline docking station base unit as a part of the described methods. That way, if the mobile station is dropped from the piconet, one of the remaining devices may control the piconet as a Bluetooth master. In the described embodiment of the invention, the Bluetooth master determines when to terminate the first wireless headset communication link between the wireless headset and the mobile station. In the case where the wireless headset operates as the master of the piconet, after receiving an indication that the mobile station has been docked, the wireless headset prompts the specified landline docking station base unit to become master of the piconet to enable the specified landline docking station base unit to drop the mobile station from the piconet after the second voice bearer path is established. Alternatively, in an embodiment where the wireless headset includes associated logic to control the piconet in relation to the described embodiments of the invention, the wireless headset determines when to drop the first wireless headset communication link with the mobile station.

Figure 7:
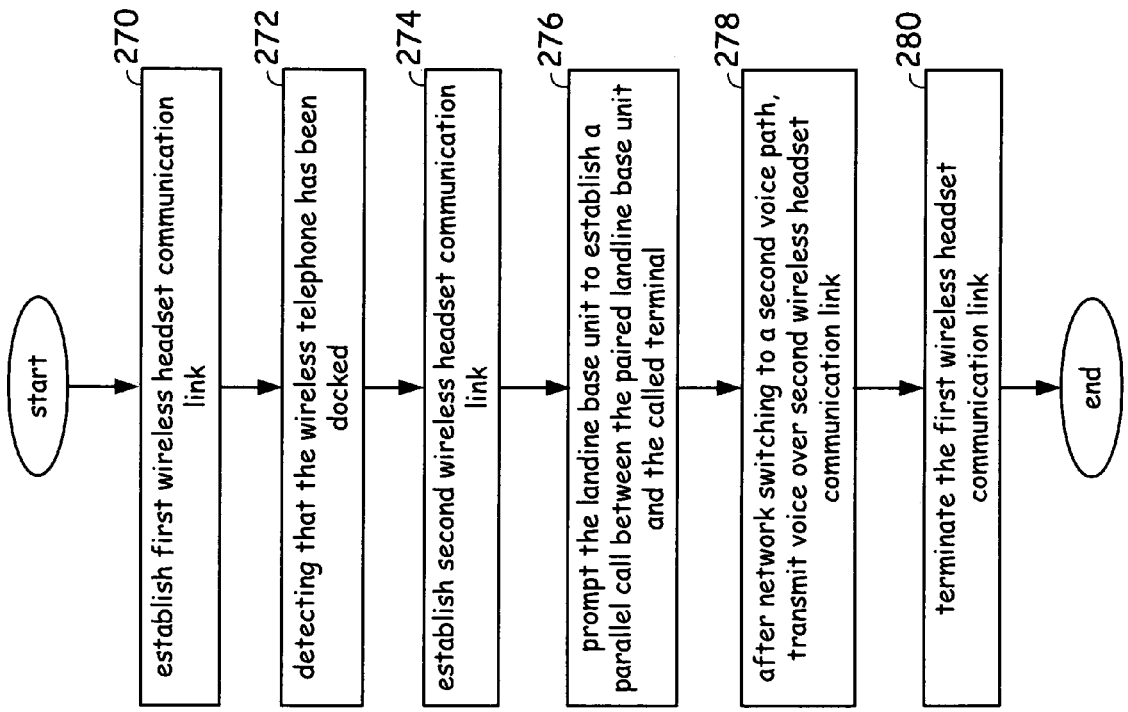
FIG. 7 is a flowchart illustrating one embodiment of the present invention.

FIG. 7 is a flowchart illustrating one embodiment of the present invention. Initially, in a communication network, a voice path is created to a wireless mobile station. For a mobile station that includes a second radio front end that is operable to establish a communication link with a wireless headset, the embodiment of the present invention includes establishing a first wireless headset communication link (step 270). Subsequently, the embodiment of the invention includes detecting that the wireless telephone has been docked (step 272). In one embodiment of the invention, as described above, the wireless telephone may be a mobile station in a cellular network. Alternatively, however, the wireless telephone may be a wireless telephone in a wireless local area network, a wireless telephone in a PBX network, etc. Thus, in more general terms, step 272 includes detecting that the wireless telephone of whatever type has been docked. Thereafter, the invention contemplates establishing a second wireless headset communication link between the wireless headset and the base unit (step 274). Either prior to or subsequent to, the invention also includes prompting one of the landline base unit or the wireless telephone to establish a parallel call between the landline base unit and the called terminal, namely, the wireless telephone (step 276). Thereafter, once the network has switched to a second voice path, the method includes transmitting voice over the second wireless headset communication link between the landline base unit and the wireless headset (step 278). Finally, the method includes terminating the first wireless headset communication link with the wireless telephone (step 280). In one embodiment of the invention, the wireless headset is operable to prompt the wireless telephone to establish the parallel call based upon receiving an indication that the wireless telephone has been docked. Additionally, the wireless headset is operable to prompt the wireless telephone to terminate the call between the service and wireless telephone and the wireless network after establishing the second wireless headset communication link.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. For example, any known telephone protocol may be utilized for establishing any of the described telephone links. For example, mobile station may comprise logic for establishing a first data context for carrying Voice over IP calls by way of the first radio front end and for establishing a second data context through the second radio front end. Similarly, the landline docking station base unit may comprise logic for establishing a data context for carrying Voice over IP calls (for the described voice paths herein). As may be seen, therefore, the described embodiments may be modified in many different ways without departing from the scope or teachings of the invention.

The invention claimed is:

1. A method of call setup and handoff in a communication path that includes at least one mobile station, comprising:
    establishing a first voice bearer path through at least one switching element between a calling party and a called party in a first communication network according to a first communication protocol wherein at least one of the called and calling parties is communicating with a mobile station;
    establishing a first wireless headset communication link between the mobile station that communicates over the first communication network according to the first communication protocol and a wireless headset unit;
    while the call is active, transmitting call setup signals from the mobile station to an associated docking station base unit in response to the mobile station being docked in the docking station base unit;
    within the first communication network, performing call setup signaling to establish a call with docking station base unit from the switching element through a second communication network that communicates according to a second communication protocol that is different from the first communication protocol and allocating resources for a second voice bearer path between the at least one switching element and the specified landline docking station base unit through the second communication network;
    establishing a second wireless headset communication link between the wireless headset unit and the specified landline docking station base unit;
    upon receiving an indication that a communication link has been established with the specified landline docking station base unit, while the wireless headset communication link with the mobile station is established, switching, in the at least one switching element, the first voice bearer path from the mobile station to the allocated resources for the second voice bearer path to establish a connection to the specified landline docking station base unit by way of the second voice bearer path; and
    terminating the first wireless headset communication link.

2. The method of claim 1 further including, prior to switching from the first voice bearer path to the resources allocated for the second voice bearer path, establishing a piconet having a master/slave relationship between the wireless headset unit, the mobile station and the specified landline docking station base unit.

3. The method of claim 2 wherein the mobile station initially operates as a Bluetooth master and subsequently prompts the specified landline docking station base unit to become the master of the piconet.

4. The method of claim 2 wherein the wireless headset unit, operating as the master of the piconet, drops the first wireless headset communication link with the mobile station after establishing the second wireless headset communication link with the specified landline docking station base unit and after receiving an indication that switching to the resources allocated for the second voice bearer path has occurred.

5. The method of claim 2 wherein the wireless headset unit, operating as the master of the piconet, receives an indication that the mobile station has been docked and, after a piconet with the specified landline docking station base unit is established, prompts the specified landline docking station base unit to become master of the piconet to enable the specified landline docking station base unit to drop the mobile station from the piconet after the second voice bearer path is established.

6. The method of claim 1 wherein the wireless headset unit is operable to receive an indication from the mobile station that the mobile station has been docked and, based upon the indication, to generate a command to the mobile station to initiate a call transfer to the specified landline docking station base unit and further to establish a communication link with the specified landline docking station base unit whereby, when a voice path is switched from the mobile station to the specified landline docking station base unit, the wireless headset unit carries voice communications with the specified landline docking station base unit instead of with the mobile station.

7. A wireless mobile station, comprising:
    first radio front end for communicating over a cellular communication link with a cellular base station;
    second radio front end for communicating over one of a wireless local area network protocol or a personal area network protocol with a wireless headset;
    a baseband processor coupled to the first and second radio front ends to produce outgoing communication signals to the first and second front ends and to receive and process ingoing communication signals from the first and second front ends;
    processing logic for controlling communications through the first and second radio front ends wherein the wireless mobile station is operable, while maintaining communication links through both the first and second radio front ends and while maintaining a call over a first voice bearer path according to a first communication protocol by way of the first radio front end, to determine that the wireless mobile station has been docked and, responsive thereto, to generate call setup signals through the first radio front end to initiate a call to a specified landline docking station base unit according to a second communication protocol; and
    wherein the wireless mobile station is operable to disconnect the call from the first bearer path after connecting to the call through a second bearer path that includes the specified landline docking station base unit.

8. The wireless mobile station of claim 7 wherein the wireless mobile station is operable to, while acting as a personal area network master on a piconet, establish a communication link with the specified landline docking station base unit through the second radio front end.

9. The wireless mobile station of claim 8 wherein the wireless mobile station is further operable to switch master/slave roles with one of the wireless headset or the specified landline docking station base unit.

10. The wireless mobile station of claim 9 wherein the wireless mobile station is operable to generate a transition ready signal for transmission to a switching element by way of the first radio front end to prompt the switching element to switch to a voice bearer path to the specified landline docking station base unit and to terminate a voice bearer path to the wireless mobile station and further wherein the mobile station does not transmit the transition ready signal until after the communication link has been established between the specified landline docking station base unit and the wireless headset through the second radio front end.

11. The wireless mobile station of claim 8 wherein the wireless mobile station generates call setup signals to a specified called party number stored within memory of the wireless mobile station which specified number is a called party number of the specified landline docking station base unit.

12. The wireless mobile station of claim 8 wherein the wireless mobile station is operable to communicate over the first radio front end according to one of North American TDMA, CDMA, GSM or EDGE cellular communication standards.

13. The wireless mobile station of claim 8 wherein the wireless mobile station is operable to communicate over the second radio front end according to one of a Bluetooth personal area network communication protocol or an 802.11 based WLAN standard protocol.

14. A wireless mobile station, comprising:
 first radio front end for communicating according to a cellular communication protocol;
 second radio front end for communicating according to a Bluetooth protocol;
 a baseband processor coupled to the first and second radio front ends;
 logic for exchanging first call setup signals between the first radio front end and a wireless base station;
 logic for establishing a first Bluetooth communication link between the second radio front end and a wireless headset;
 logic for initiating a call transfer to prompt a communication network element to transfer the call from the first radio front end to a specified landline docking station base unit;
 logic for establishing a second Bluetooth voice communication link between the second radio front end and the specified landline docking station base unit that communicates according to a communication protocol that is different from the cellular communication protocol; and
 logic for switching master/slave roles with one of a wireless headset or the specified landline docking station base unit to switch the wireless mobile station into a Bluetooth slave role.

15. The wireless mobile station of claim 14 wherein the wireless mobile station initiates the call transfer upon determining that the wireless mobile station has been docked.

16. The wireless mobile station of claim 14 wherein the wireless mobile station generates a transition ready signal to prompt network switching of a voice bearer path from the wireless mobile station to the specified landline docking station base unit.

17. The wireless mobile station of claim 14 wherein the wireless mobile station generates the transition ready signal only after the second Bluetooth voice communication link has been established and after a Bluetooth communication link has been created between the wireless headset and the specified landline docking station base unit.

18. The wireless mobile station of claim 17 wherein the wireless mobile station generates the transition ready signal only after the specified landline docking station base unit and the wireless mobile station have exchanged master/slave roles to make the specified landline docking station base unit the master.

19. The wireless mobile station of claim 14 further including logic for establishing a first data context for carrying Voice over IP calls by way of the first radio front end and for establishing a second data context through the second radio front end.

20. A method of servicing a voice communication and more specifically for establishing a call between a servicing wireless telephone and a called terminal via a servicing wireless network, comprising:
 establishing a first wireless headset communication link between the servicing wireless cellular telephone that communicates according to a cellular protocol and a wireless headset unit;
 detecting that the servicing wireless telephone has been docked;
 establishing a second wireless headset communication link between the wireless headset unit and a paired landline base unit that communicates according to a communication protocol that is different from the cellular communication protocol;
 establishing a parallel call between the paired landline base unit and the called terminal; and
 terminating the call between the servicing wireless telephone and the called terminal.

21. The method of claim 20 wherein the wireless headset unit is operable to prompt a mobile station to establish the parallel call based upon receiving an indication that the mobile station has been docked.

22. The method of claim 20 wherein the wireless headset unit is operable to prompt the mobile station to terminate the call between the servicing wireless telephone and the called terminal via the servicing wireless network after establishing the second wireless headset communication link.

* * * * *